UNITED STATES PATENT OFFICE.

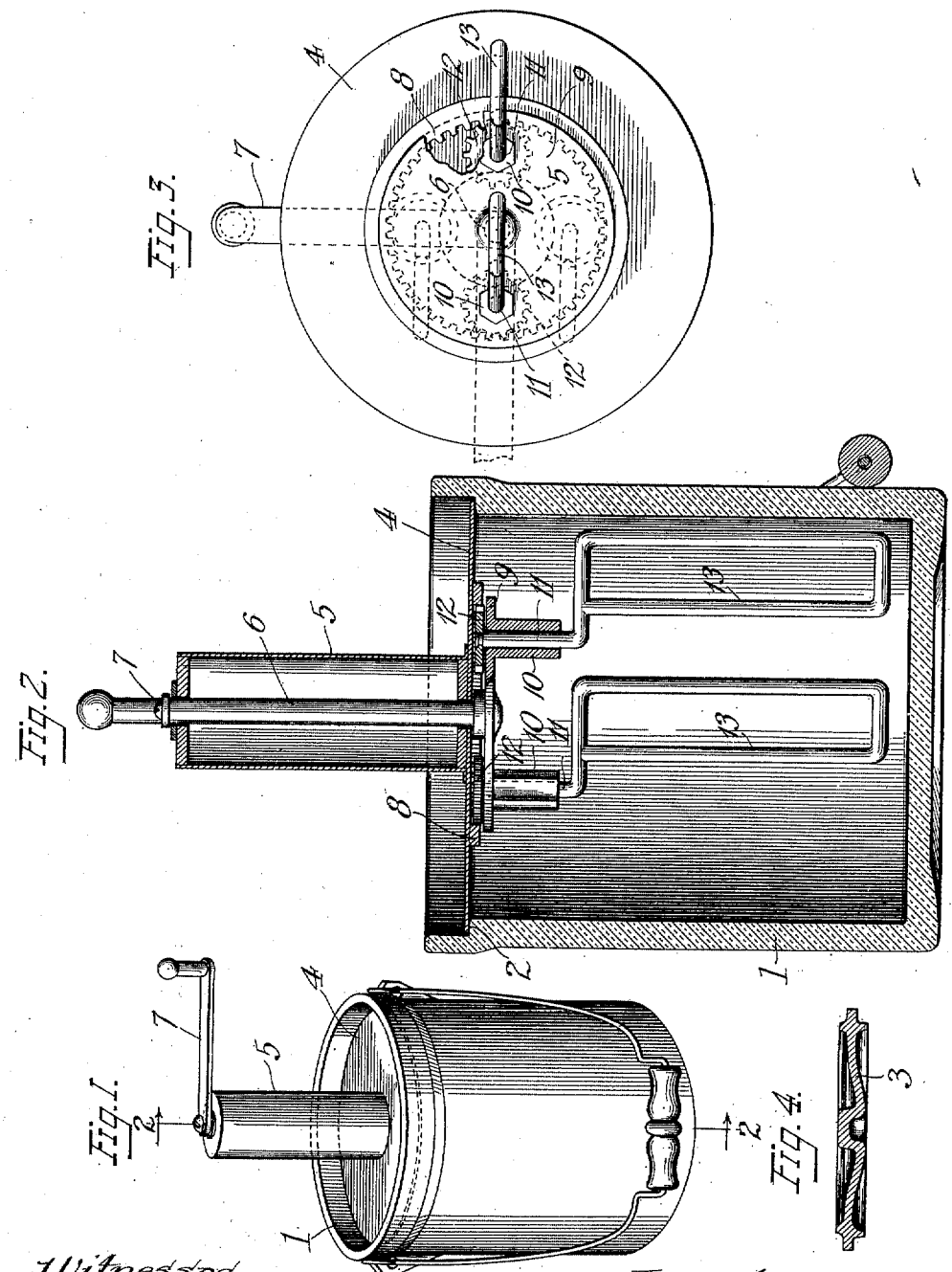

JOHN H. DAVIS, OF CHICAGO, ILLINOIS.

BUTTER-COMPOUND MIXER.

984,079.  Specification of Letters Patent.  Patented Feb. 14, 1911.

Application filed March 21, 1910. Serial No. 550,788.

*To all whom it may concern:*

Be it known that I, JOHN H. DAVIS, a citizen of the United States of America, and a resident of Chicago, county of Cook, State of Illinois, have invented certain new and useful Improvements in Butter-Compound Mixers, of which the following is a specification.

The main objects of this invention are to provide an improved form of mixer adapted to thoroughly and rapidly mix butter or other compounds; to provide a mixer in which the stirrers are so mounted that their paths are continually changing during their travel through the mixture; and to provide a mixer in which the mixing mechanism may be removed from the receptacle when the operation is completed in order to permit the receptacle to be sealed.

A specific construction embodying the invention is illustrated in the accompanying drawings, in which:—

Figure 1 is a perspective view of a mixer embodied in the invention. Fig. 2 is an enlarged section taken on line 2—2 of Fig. 1, and showing parts in elevation. Fig. 3 is a bottom plan view of the mixing mechanism. Fig. 4 is a section of the cover adapted to close the receptacle when the mixing mechanism is removed.

In the construction shown, the earthenware receptacle 1 has a ledge or shoulder 2 on its inner surface near its top, which shoulder is adapted to support the mixing mechanism when the latter is in the receptacle, or to support the cover 3 when the mixing mechanism is removed. A plate or disk 4 supports the mixing mechanism and is of a size to fit within the top of the receptacle and rest on the shoulder 2. A tubular handle or post 5 is rigidly secured to the top of the plate 4, and is in axial alinement with the plate and receptacle. Journaled in the post and plate 4 is a shaft 6, the lower end of which extends through the plate, and the upper end of which projects from the top of the post sufficiently to receive the crank 7 by means of which the shaft may be rotated.

Rigidly secured on the under side of the plate 4, in axial alinement with the shaft, is an annular gear 8, which has teeth on its inner circumference. A plate or disk 9 is rigidly secured on the lower end of the shaft 6 and fits closely against the under side of the gear 8 to prevent the contents of the receptacle from entering the gear 8. Bearing sleeves 10 extend downwardly from the plate 9, and journaled in said sleeves are the stirrer shafts 11. On the upper end of each shaft 11, between the plates 4 and 9, is a pinion 12 which meshes with the gear 8. The gear is not an exact multiple of the pinions, and as a consequence the rotations of the pinions are constantly shifting with respect to the gear during successive revolutions.

Each stirrer 13 comprises a loop formed integrally with the shaft 11 and offset laterally therefrom a distance greater than the distance between the axes of the main shaft 6 and the stirrer shaft 11, and extends downwardly to near the bottom of the receptacle.

The operation of the device shown is as follows: The mixing mechanism is placed in the receptacle with the plate 4 resting on the shoulder 2. When the shaft 6 is rotated it causes the plate 9 to rotate and move the pinions 12 along the gear 8, which movement causes the pinions to rotate. The rotation of the pinions causes rotation of the stirrer shafts and stirrers. Inasmuch as the gear 8 is not an exact multiple of the pinions 12, the rotation of the stirrers does not take place at the same points during successive revolutions about the receptacle, and as a consequence the stirrers come in direct contact with the entire contents of the receptacle. After the contents of the receptacle have been thoroughly mixed, the stirring mechanism is removed and the cover 3 is placed on the receptacle, and the receptacle may be set away until it is desired to remove the mixture therefrom.

Although but one specific embodiment of this invention is herein shown, it will be understood that numerous details of the construction shown may be varied or omitted without departing from the spirit of this invention.

I claim:—

1. A mixer, comprising a receptacle having an annular ledge, a plate supported on said ledge, an annular gear on said plate, a shaft journaled in the plate, a plate on said shaft and overlapping the gear, stirrers journaled in said last named plate, and a pinion on each stirrer intermediate the plates and meshing with said gear.

2. A mixer, comprising a receptacle, a plate supported in the receptacle, an annular gear on the under side of the plate, a shaft journaled in the plate, a plate rigidly secured on the lower end of said shaft overlapping said gear and rotative with said shaft, stirrer shafts journaled in said rotative plate, a laterally offset stirrer on each stirrer shaft, and a pinion on each stirrer shaft adapted to mesh with the gear.

3. A mixer, comprising a receptacle, a plate supported in said receptacle, an annular gear on said plate, pinions meshing with said gear, a shaft journaled in said plate and arranged to revolve said pinions thereabout, and a stirrer connected to each of said pinions, said stirrers being each constructed so that the diameter of the circle described thereby is substantially greater than half the diameter of said receptacle.

4. A mixer, comprising a receptacle, a plate supported in said receptacle, an annular gear on said plate, a shaft journaled in said plate, a second plate carried by said shaft, stirrers each comprising a shaft journaled in said second plate, and having formed thereon an integral eccentrically offset loop, and pinions carried by said stirrer shafts intermediate of said plates and in mesh with said gear.

5. A mixing apparatus, comprising a plate, an annular gear on said plate, an upstanding handle on said plate, a shaft journaled in said handle, a second plate carried by said shaft, stirrers journaled in said second plate, and pinions connected with said stirrers and located between said plates, and in mesh with said gear.

Signed at Chicago this 17th day of March 1910.

JOHN H. DAVIS.

Witnesses:
EUGENE A. RUMMLER,
CHARLES L. HOPKINS.